No. 735,662. PATENTED AUG. 4, 1903.
J. F. GENT.
MACHINE FOR SPLITTING KERNELS OF INDIAN CORN.
APPLICATION FILED NOV. 5, 1902.
NO MODEL. 4 SHEETS—SHEET 2.
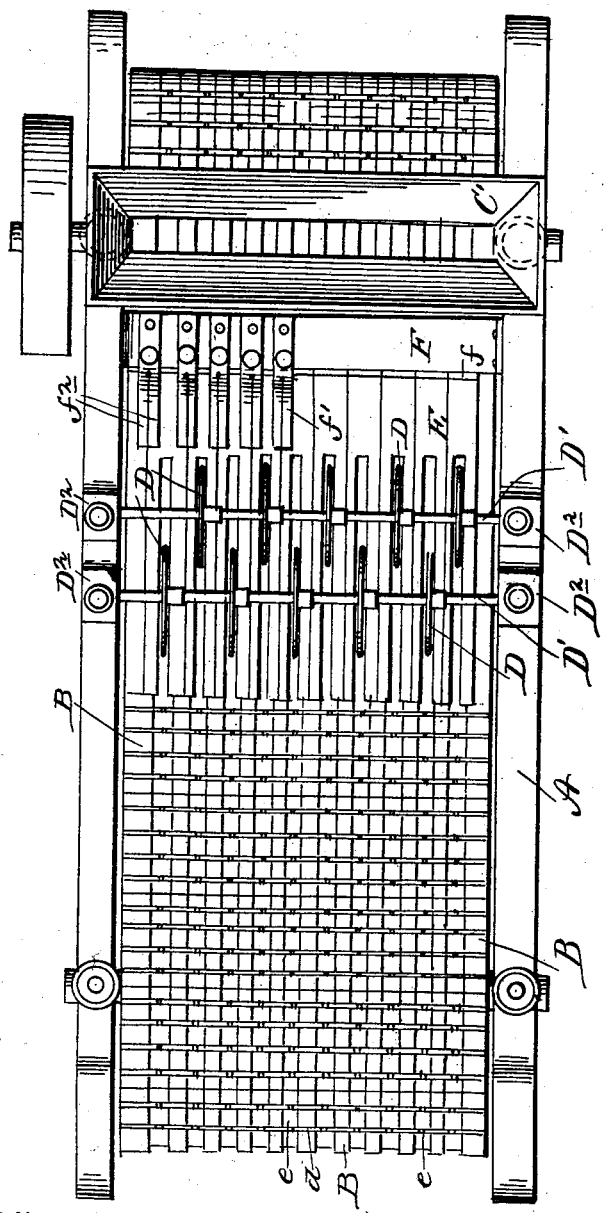
Witnesses
Franck L. Ourand
Wella Dick
Inventor
Joseph F. Gent
by Marcellus Bailey
Attorney

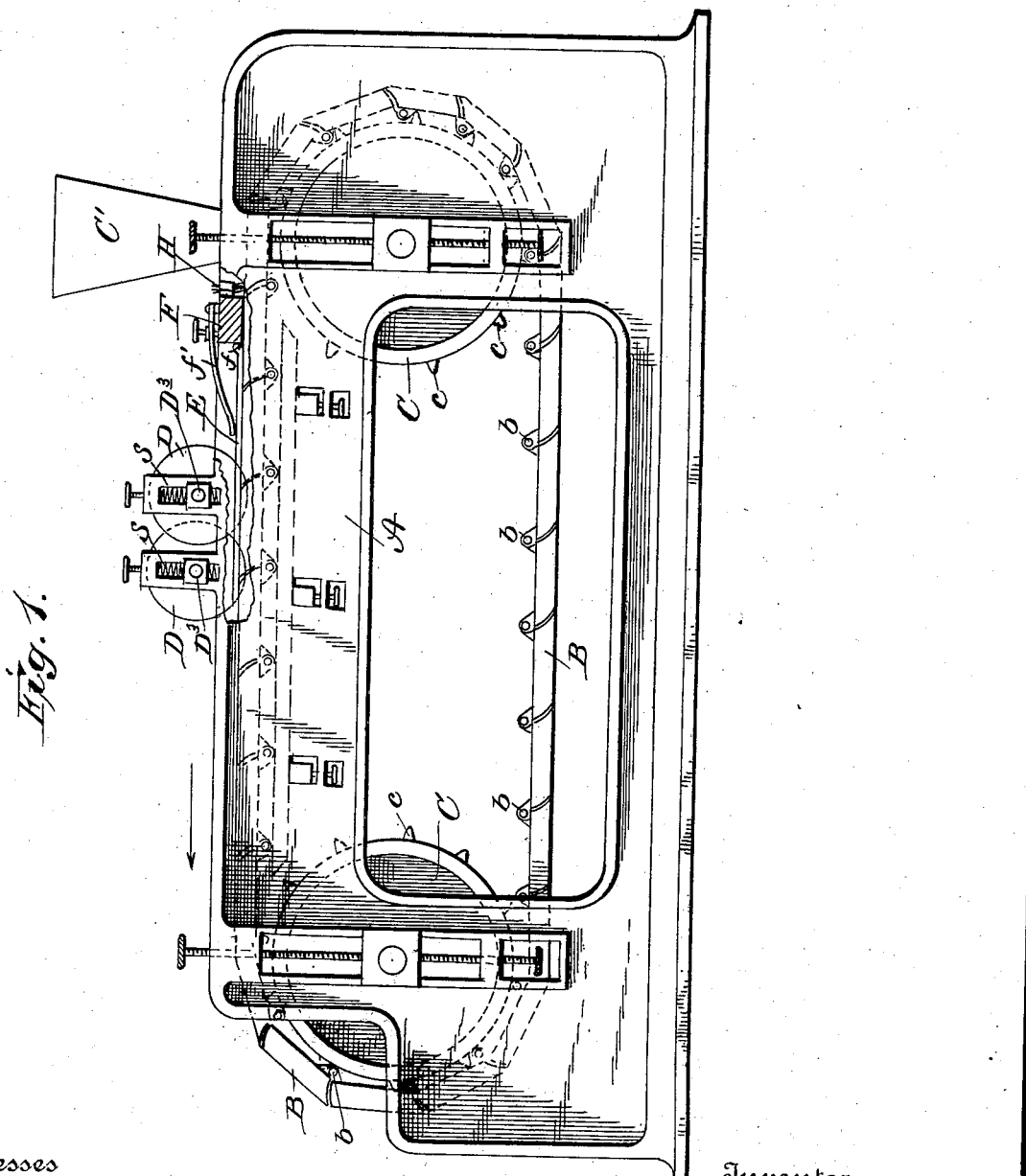

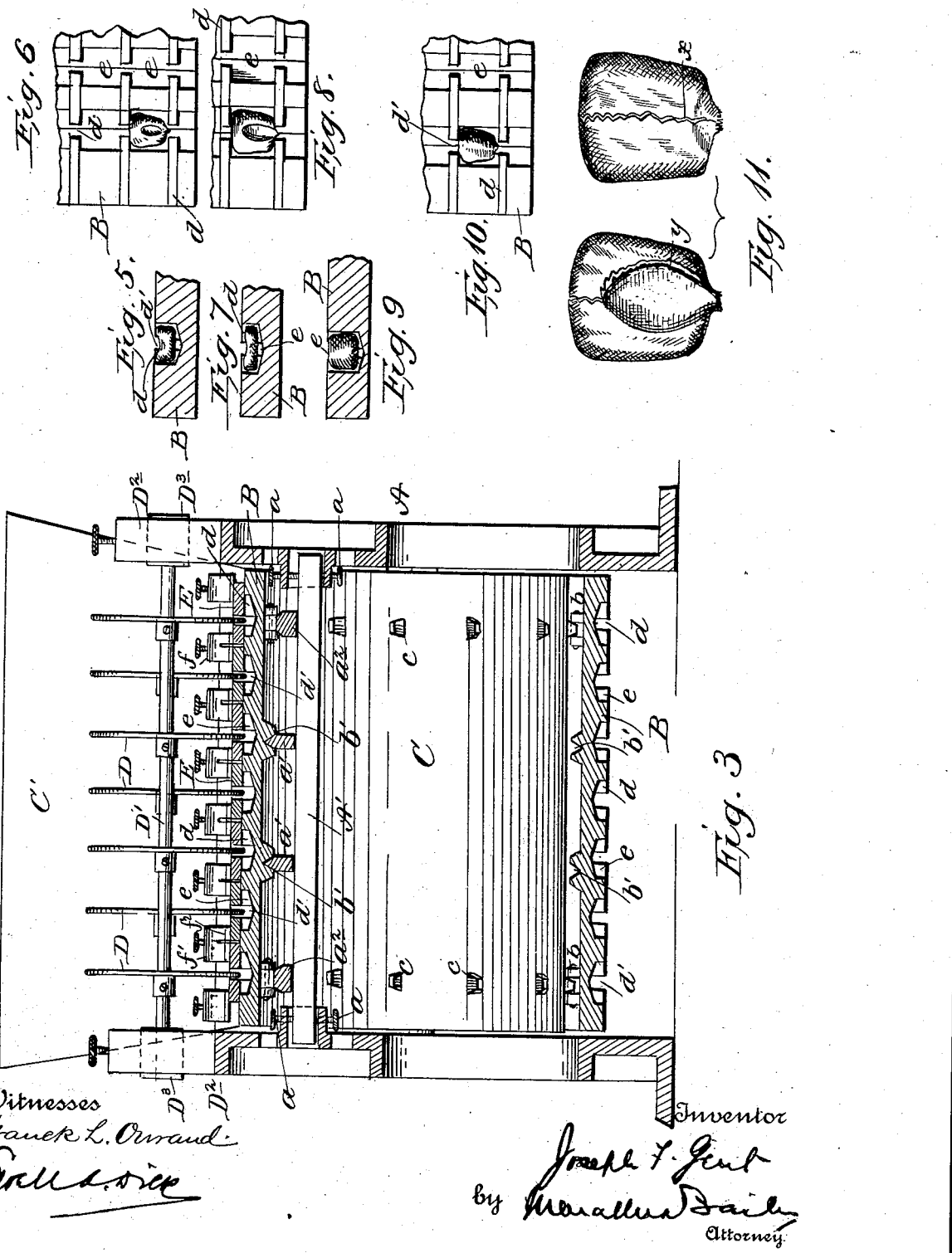

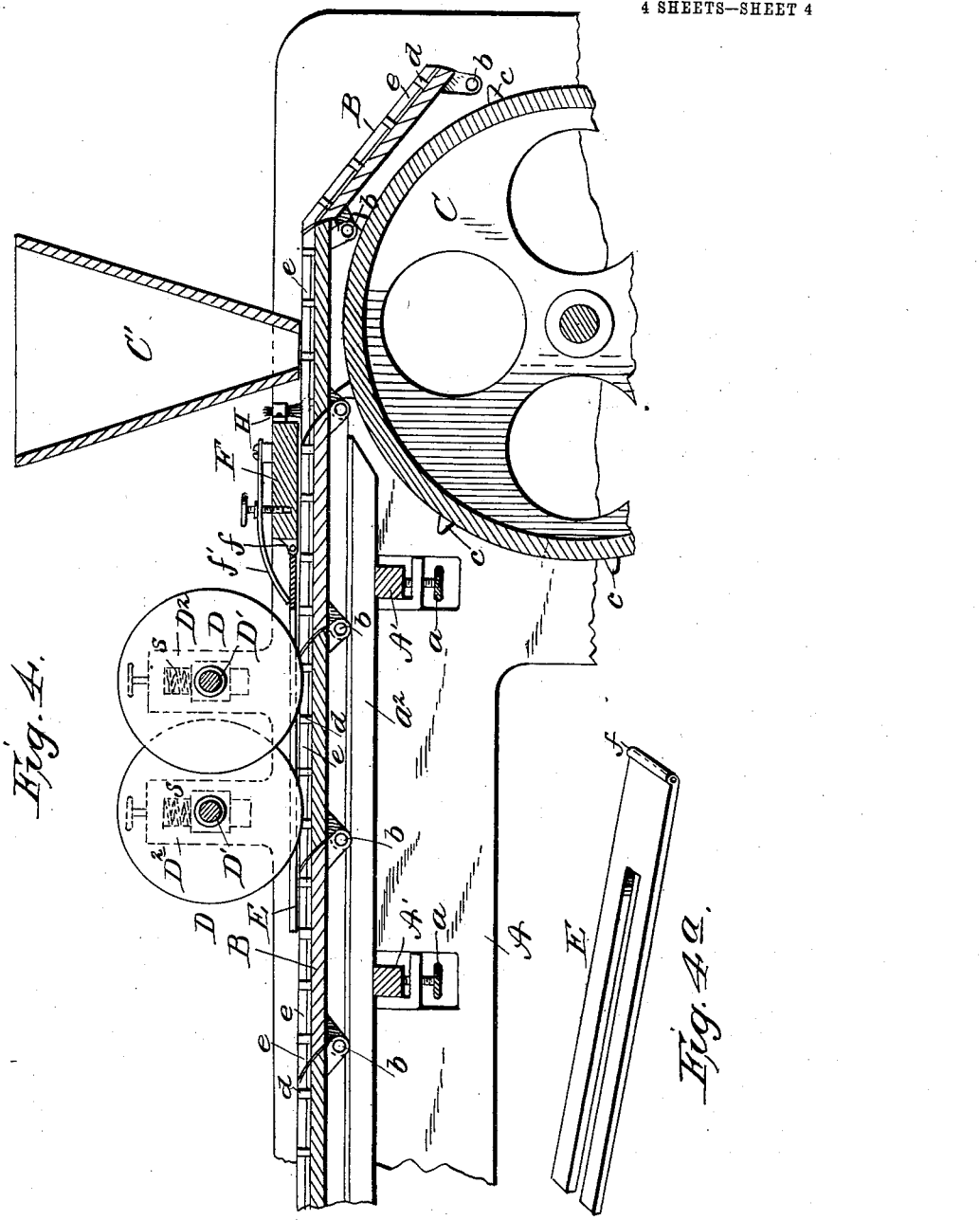

No. 735,662. Patented August 4, 1903.

UNITED STATES PATENT OFFICE.

JOSEPH F. GENT, OF MOUNT CLEMENS, MICHIGAN, ASSIGNOR OF TWO-THIRDS TO THOMAS T. GAFF, OF BARNSTABLE, MASSACHUSETTS.

MACHINE FOR SPLITTING KERNELS OF INDIAN CORN.

SPECIFICATION forming part of Letters Patent No. 735,662, dated August 4, 1903.

Application filed November 5, 1902. Serial No. 130,121. (No model.)

*To all whom it may concern:*

Be it known that I, JOSEPH F. GENT, of Mount Clemens, in the county of Macomb and State of Michigan, have invented a new and useful Machine for Splitting Kernels of Indian Corn, of which the following is a specification.

My invention is designed to assist the operation of degerming Indian corn, and its object is to put the kernels in such condition that when they are ground or treated in the "degerminator," so called, the germs will be readily and thoroughly separated from the starch-bearing portions of the kernels. I find that by fracturing the individual kernels (in contradistinction to cutting or slitting them) lengthwise of the grain this object is attained. If the kernel be cut in two centrally lengthwise, all the germ will be cut and divided along with the body of the kernel and a portion of it will remain with each half of the grain; but if the kernel be simply split or fractured lengthwise of the grain the line of fracture or cleavage will in most instances pass to one side or the other of the germ, as the case may be, thus leaving the whole of the germ adherent to one half of the kernel and exposed in such condition as to render easy the after work of separating it from the starchy portion to which it adheres. Availing myself of this fact I have devised a machine the characteristic of which is that it comprises a carrier provided with pockets for the reception of individual kernels of Indian corn, in combination with means for fracturing lengthwise of the grain these individual kernels while held in their pockets.

The nature of my invention and the manner in which the same is or may be carried into effect will be readily understood by reference to the accompanying drawings, in which—

Figure 1 is a side elevation of a machine embodying my invention. Fig. 2 is a plan of the same. Fig. 3 is an enlarged vertical cross-section of the same. Fig. 4 is an enlarged longitudinal vertical section of a portion of the machine. Fig. 4ª is an enlarged perspective view of one of the covering-tongues. Figs. 5 to 10 are views, hereinafter more particular referred to, of kernels of corn of various shapes. Fig. 11 is a view of two opposite faces of a kernel, designed to show the line of cleavage.

A is the frame of the machine. The carrier for the individual kernels consists in the present instance of an endless apron composed of cross-slats B, of wood or other suitable material, hinged together at *b* and passing around sprocket drums or wheels C, mounted in the frame A, the knuckles of the hinge-joints *b* being formed to engage the sprockets *c* on the drums, as usual in this general class of machinery, and one of the drums (preferably the one at the left of the machine in Fig. 1) being power-driven, so as to move the carrier-apron in the direction of the arrow.

In the face of the slats are formed grooves which extend lengthwise of the machine, which grooves are intersected by cross-partitions *d*, which divide the grooves into a series of pockets *e*, of which the cross-partitions *d* are the front and rear walls. These pockets are longer than they are wide and are of such size as to receive individual kernels of the grade or size for which the pockets are intended, the kernels lying flat and lengthwise in their respective pockets, and their grain or line of cleavage is in the direction of their length. The kernels are longer than they are wide and the pockets are of corresponding dimensions, so that the kernels to get into the pockets must lie therein with their grain or line of cleavage lengthwise of the carrier. The bottom of each pocket is V-shaped in cross-section, so that the kernel will rest by its side edges only on the bottom, having beneath the body of the kernel a central space which will facilitate the splitting or fracturing of the kernel when pressure from above is applied to it along its lengthwise middle line.

To maintain the carrier-apron level and to uphold it at the point where downward pressure comes upon it in the operation of splitting or fracturing the individual kernels contained in the pockets *e*, I provide a supporting-table A', suitably mounted in the frame of the machine and provided with adjusting devices (such as the opposed adjusting-screws $a\,a$, Fig. 3) by which it can be adjusted and held in required position. Upon the upper face of this table are longitudinal guide and supporting rails $a'\,a^2$. Upon the flat tops of the outer rails $a^2$ bear the hinge-knuckles $b$, and the tops of the intermediate rails $a'$ enter guide-grooves $b'$ on the under or inner face of the carrier-slats B, as indicated plainly in Fig. 3.

The fracturing or breaking of the kernels contained in the pockets $e$ is effected by what I term "splitting" devices, in contradistinction to devices which are intended to slit and cut. These devices may be of varied construction; but I prefer to employ for this purpose thin circular metallic (preferably steel) disks D, mounted upon one or more cross-shafts D', which overhang the carrier, as seen in Figs. 1, 2, and 3, and are supported in bearings $D^2$ in the pillow-blocks $D^3$, in which said bearings are adjustable, and are held in adjusted position by spring-yielding devices $s$, which will permit the bearings to hold down the shafts D' with yielding and adjustable pressure. Devices of this kind are well known to the skilled mechanic and require no detailed description. The disks D have a rounded or abruptly-beveled edge, so that they will not cut appreciably under the conditions of their use. They are arranged so that one of the disks will be opposite to and enter the pockets of one of the parallel rows of pockets in the carrier, there being one disk for each row of pockets, and will bear upon the individual kernels contained in the successive pockets of that row as the carrier moves along. Each disk is arranged in the vertical plane of the longitudinal center of its row of pockets and delivers its pressure upon the successive kernels along that line, and the cross-partitions $d$, which form the end walls of the pockets, are centrally slotted, as at $d'$, to permit the acting edges of the disks to enter the successive pockets as the carrier moves along.

As the kernels in the pockets rest at their side edges only on the bottom of the pockets, the pressure of the splitting-disks D from above upon them and along their longitudinal middle has the effect of cracking and breaking or fracturing them lengthwise of the grain into two pieces. The line of cleavage or separation in the starchy portion of the grain is along the longitudinal center of the kernel, as represented at $x$, Fig. 11, where the line of cleavage on that face of the kernel which is farthest removed from the germ is practically straight; but where the germ is located in the kernel the line of cleavage, owing to the superior toughness of the germ in a majority of cases, deflects around and to one side or the other of the germ, as indicated by $y$, Fig. 11, which represents the germ-face of the same kernel leaving the germ adherent to one division of the kernel and separated or loosened from the other. In any event, as I have found in practical experience, the line of cleavage in the kernel is lengthwise of the grain, but deflects around the germ to one side or the other, so as to leave the latter practically adhering to one section of the kernel and in such position as to much facilitate the subsequent degerming operation.

To hold down the kernels in their pockets during the operation of the splitting devices, I make use of retaining or covering tongues E, (one of which is shown separately in Fig. $4^a$,) which are hinged at $f$ to a cross-bar F, suitably attached to the frame of the machine and are in position to cover the tops of the pockets at the point where the kernels in the latter are acted on by the splitting devices being downwardly spring-pressed by springs $f'$, attached to the cross-bar F. The tongues are longitudinally slotted at $f^2$, so as to permit the slitting-disks to pass down therethrough into the pockets.

The kernels of corn are fed to the machine through a hopper C, from which they fall upon the carrier which passes immediately below and enter the pockets $e$ therein. The corn is fed to the carrier at a point in advance of the cross-bar F, which latter is arranged immediately above the carrier and acts as a wiper to hold back all such kernels as have not entered properly their pockets. Between the cross-bar and the hopper I locate a brush H, which extends across and just above the carrier, so that it may serve to sweep the kernels into their pockets, as well as measurably to prevent loose and misplaced kernels from being carried along on the face of the carrier.

The corn previously to being fed to the machine should be washed to rid it of dirt and refuse and should also be moistened (and subsequently dried) to such a degree as to toughen it and prevent it from crumbling and going into meal under the action of the splitting devices, as it might do if left in its original brittle condition.

The kernels after having been broken or fractured, as above described, are discharged from the left-hand end and are then treated in suitable machinery or by suitable processes for the separation of the germs from the starchy portions. A suitable apparatus for this purpose is described, for instance, in Letters Patent No. 707,057, of August 12, 1902, granted to T. T. Gaff and myself for apparatus for the degermination and decortication of Indian corn.

I remark that the kernels of Indian corn can be graded by size into three grades, which grades will usually be found upon every ear of corn. These three grades are represented in plan and sectional elevation in Figs. 5 to 10, each kernel being shown in its appropriate pocket. The kernel represented in Figs. 5 and 6 is of medium thickness and narrow in proportion to its length. That in Figs. 7 and 8 is flat and noticeably thin and of a width approximating its length. That in Figs. 9 and 10 is noticeably thick—much more so than either of the other specimens—and is quite narrow in proportion to its length. Each of these grades requires pockets e of a shape and size different from those required for the others, as will be seen by inspection of the figures under consideration. In practice, therefore, I find it advisable to preliminarily assort (as can be done by suitable appliances) the mass of corn into three grades and then to treat each grade separately, using for each grade a carrier with pockets adapted to the kernels of that grade. This I can do either by providing a different machine for each grade or by changing the carrier in the same machine, according to the grade to be treated.

Having described my improvement and the best way now known to me of carrying the same into practical effect, I state in conclusion that I do not restrict myself to the structural details herein set forth and represented in illustration of the invention; but

What I claim as new, and desire to secure by Letters Patent, is as follows:

1. A machine for splitting kernels of Indian corn, comprising in combination a carrier, pockets therein for receiving and holding individual kernels having bottoms provided with a longitudinal central depression means for feeding the kernels to the carrier, and means for splitting or fracturing the individual kernels in said pockets lengthwise of the grain, substantially as and for the purposes hereinbefore set forth.

2. The carrier provided with parallel rows of pockets which have their end walls slotted for the passage of the splitting-disks, and their bottoms longitudinally and centrally depressed so that the kernels will rest thereon by their side edges only, in combination with the splitting-disks one for each row of pockets, arranged and adapted to act upon the kernels successively as the carrier moves along, substantially as and for the purposes hereinbefore set forth.

3. The carrier provided with parallel rows of kernel-receiving pockets, having their end walls slotted for the passage of the splitting-disks, in combination with the splitting-disks, one for each row of pockets, and the downwardly spring-pressed and longitudinally-slotted retaining or covering tongues for holding in place the kernels while they are being acted on by the splitting devices, substantially as and for the purposes hereinbefore set forth.

In testimony whereof I have hereunto set my hand this 1st day of November, 1902.

JOSEPH F. GENT.

Witnesses:
  LOUIS MATT,
  ANA MATT.